US010987739B2

(12) United States Patent
Yamamoto et al.

(10) Patent No.: US 10,987,739 B2
(45) Date of Patent: Apr. 27, 2021

(54) CEMENTED CARBIDE AND CUTTING TOOL

(71) Applicant: Sumitomo Electric Industries, Ltd., Osaka (JP)

(72) Inventors: Tsuyoshi Yamamoto, Itami (JP); Michiko Matsukawa, Itami (JP); Yasuki Kido, Itami (JP); Keiichi Tsuda, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 733 days.

(21) Appl. No.: 15/735,766

(22) PCT Filed: Dec. 15, 2015

(86) PCT No.: PCT/JP2015/085097
§ 371 (c)(1),
(2) Date: Dec. 12, 2017

(87) PCT Pub. No.: WO2016/203674
PCT Pub. Date: Dec. 22, 2016

(65) Prior Publication Data

US 2018/0169766 A1 Jun. 21, 2018

(30) Foreign Application Priority Data

Jun. 15, 2015 (JP) ............................ JP2015-119999

(51) Int. Cl.
*B23B 27/14* (2006.01)
*C22C 29/08* (2006.01)
(Continued)

(52) U.S. Cl.
CPC ............ *B23B 27/148* (2013.01); *B23B 51/00* (2013.01); *C22C 1/051* (2013.01); *C22C 29/08* (2013.01);
(Continued)

(58) Field of Classification Search
CPC .... B23B 27/14; B23B 27/148; B23B 2222/28
(Continued)

(56) References Cited

U.S. PATENT DOCUMENTS

2012/0144753 A1 6/2012 Okuno et al.
2015/0247219 A1* 9/2015 Berglund ................. C22C 1/05 75/240

FOREIGN PATENT DOCUMENTS

JP 3014307 B2 2/2000
JP 2004-256861 A 9/2004
(Continued)

*Primary Examiner* — Archene A Turner
(74) *Attorney, Agent, or Firm* — Baker Botts L.L.P.; Michael A. Sartori

(57) ABSTRACT

Provided are a cemented carbide having excellent plastic deformation resistance and a cutting tool in which the cemented carbide is used as a substrate. A cemented carbide includes a hard phase containing tungsten carbide particles and a binder phase containing, as a main component, an iron-group element, wherein the formula $B/A \leq 0.05$ is satisfied, where A represents the number of the tungsten carbide particles, and B represents the number of tungsten carbide particles whose number of contact points with other tungsten carbide particles is 1 or less. Preferably, the iron-group element includes cobalt, and the cobalt content in the cemented carbide is 8% by mass or more. Preferably, the tungsten carbide particles have an average particle diameter of 3 μm or more.

6 Claims, 3 Drawing Sheets

(51) Int. Cl.

| | |
|---|---|
| ***B23B 51/00*** | (2006.01) |
| ***C22C 1/05*** | (2006.01) |
| *B22F 5/00* | (2006.01) |
| *C22C 29/00* | (2006.01) |

(52) U.S. Cl.
CPC ..... *B22F 2005/001* (2013.01); *B22F 2998/10* (2013.01); *B23B 2200/0428* (2013.01); *B23B 2200/3618* (2013.01); *B23B 2222/28* (2013.01); *C22C 1/05* (2013.01); *C22C 29/005* (2013.01)

(58) Field of Classification Search
USPC .................................................. 428/469, 698
See application file for complete search history.

(56) References Cited

FOREIGN PATENT DOCUMENTS

| | | | |
|---|---|---|---|
| JP | 2012-143862 | A | 8/2012 |
| JP | 2015-101746 | A | 6/2015 |
| WO | 2011021554 | A1 | 2/2011 |

* cited by examiner

1 μm

1 μm

CEMENTED CARBIDE AND CUTTING TOOL

TECHNICAL FIELD

The present invention relates to a cemented carbide which can be used as a material for cutting tools, dies, and the like, and a cutting tool. More particularly, the invention relates to a cemented carbide having excellent plastic deformation resistance, and a cutting tool in which the cemented carbide is used.

BACKGROUND ART

Cemented carbides are used, for example, as a material for cutting tools and dies. A cemented carbide typically includes a hard phase containing, as a main component, tungsten carbide (WC) and a binder phase containing, as a main component, cobalt (Co). For example, Patent Literature 1 discloses a cemented carbide having excellent plastic deformation resistance in which the composition is adjusted and the oxygen content, porosity, and hardness are set in predetermined ranges.

CITATION LIST

Patent Literature

PTL 1: Japanese Unexamined Patent Application Publication No. 2012-143862

SUMMARY OF INVENTION

Technical Problem

In order to realize highly efficient machining which meets the stricter cutting conditions recently required, cutting tools with a longer life, and dies with a long life, there is a demand for a cemented carbide having higher plastic deformation resistance. However, there is a limit to the improvement in plastic deformation resistance by adjusting the composition and the like as in the cemented carbide described in Patent Literature 1.

The present invention has been made under these circumstances, and it is an object of the invention to provide a cemented carbide having excellent plastic deformation resistance.

Solution to Problem

A cemented carbide according to an embodiment of the present invention includes a hard phase containing tungsten carbide particles and a binder phase containing, as a main component, an iron-group element. In the cemented carbide, the formula $B/A \leq 0.05$ is satisfied, where A represents the number of the tungsten carbide particles, and B represents the number of tungsten carbide particles whose number of contact points with other tungsten carbide particles is 1 or less.

Advantageous Effects of Invention

The cemented carbide according to the invention has excellent plastic deformation resistance.

DESCRIPTION OF EMBODIMENTS

Figure 1:
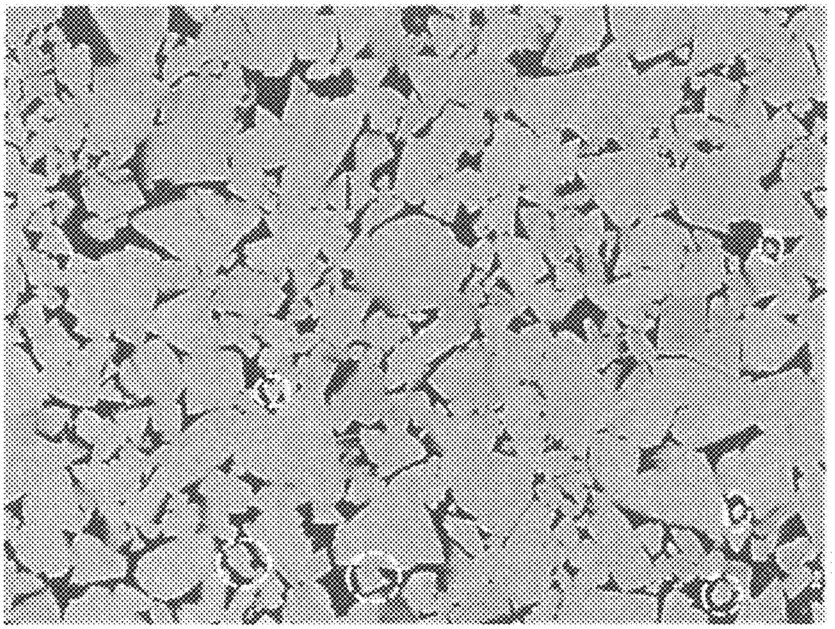
FIG. 1 is a scanning electron micrograph of a cross section of a cemented carbide according to an embodiment of the present invention.

Description of Embodiments of the Present Invention

First, embodiments of the present invention are enumerated and described.

<1> A cemented carbide according to an embodiment of the present invention is a cemented carbide including a hard phase containing tungsten carbide particles and a binder phase containing, as a main component, an iron-group element. In the cemented carbide, the formula $B/A \leq 0.05$ is satisfied, where A represents the number of the tungsten carbide particles, and B represents the number of tungsten carbide particles whose number of contact points with other tungsten carbide particles is 1 or less.

The cemented carbide has excellent plastic deformation resistance. The reason for this is considered to be that because of the small proportion of WC particles whose number of contact points with other WC particles is low, there are many contact points between WC particles, and the state in which WC particles are sufficiently bound together is maintained.

<2> The cemented carbide according to an embodiment of the present invention may include, as the hard phase, a composite compound phase composed of at least one composite compound selected from carbides, nitrides, and carbonitrides containing W and one or more elements selected from Group 4, 5, and 6 elements of the periodic table, excluding W, and Si. The area fraction of the composite compound phase relative to any surface or cross section of the cemented carbide may be 1% to 10%. Furthermore, the proportion of a composite compound phase portion having an area of 10 $\mu m^2$ or more may be less than 5% in the entire composite compound phase present in the surface or cross section.

When the cemented carbide includes the composite compound phase, in addition to an improvement in plastic deformation resistance due to binding between WC particles, strength can be improved by binding between WC particles and composite compound particles. When the area fraction of the composite compound phase relative to any surface or cross section of the cemented carbide is 1% or more, strength can be improved. On the other hand, when the area fraction is 10% or less, a sufficient amount of WC particles can be secured, resulting in excellent plastic deformation resistance and strength. If each composite compound phase portion has an area of 10 $\mu m^2$ or more, the composite compound phase portion is likely to act as a starting point for breakage, which can cause a decrease in fracture resistance. Accordingly, when the proportion of the composite compound phase portion having an area of 10 $\mu m^2$ or more is less than 5%, the number of starting points for breakage is low, and it is possible to suppress a decrease in fracture resistance.

<3> In the cemented carbide according to an embodiment of the present invention, the iron-group element may include cobalt, and the cobalt content in the cemented carbide may be 8% by mass or more.

By setting the Co content in the cemented carbide to be 8% by mass or more, it is possible to produce a cemented carbide in which fracture is unlikely to occur. Furthermore, even in the case where the Co content is high, it is possible to achieve a state in which WC particles are in contact with and bound to each other.

<4> In the cemented carbide according to an embodiment of the present invention, the tungsten carbide particles may have an average particle diameter of 3 μm or more.

When the WC particles have an average particle diameter of 3 μm or more, it is possible to produce a cemented carbide having excellent toughness and excellent fracture resistance.

<5> A cutting tool according to an embodiment of the present invention is a cutting tool in which the cemented carbide according to an embodiment of the present invention is used as a substrate.

In the cutting tool, since the cemented having excellent plastic deformation resistance is used as a substrate, it is possible to realize highly efficient machining which meets the stricter cutting conditions and prolonged life.

<6> The cutting tool according to an embodiment of the present invention may be provided with a hard coating which covers at least part of a surface of the substrate.

When the surface of the substrate is provided with the hard coating, wear resistance of a tool and the like can be improved. Accordingly, the cutting tool can meet the stricter cutting conditions and realize prolonged life.

<7> In the cutting tool according to an embodiment of the present invention, the hard coating may be formed by at least one of a chemical vapor deposition method and a physical vapor deposition method.

When the hard coating is formed by a chemical vapor deposition (CVD) method or physical vapor deposition (PVD) method, which is a gas phase method, it is possible to produce a hard coating having excellent adhesion to substrate.

DETAILED DESCRIPTION OF EMBODIMENTS OF THE PRESENT INVENTION

Regarding an approach to improve the plastic deformation resistance of a cemented carbide, the present inventors have focused on sufficient binding of WC particles of the hard phase to each other, instead of adjustment of the composition or the like, and have conducted various studies. As a result, the following findings have been made, and the present invention has been achieved.

(A) During sintering of a cemented carbide, when a liquid phase of the binder phase is generated in a state in which WC particles are not sufficiently bound together, the liquid phase is likely to penetrate between WC particles, and it is difficult to sufficiently bind WC particles together after sintering.

(B) During sintering of a cemented carbide, if it is possible to sufficiently bind WC particles together, for example, to cause necking of WC particles, before a liquid phase of the binder phase is generated, the state in which WC particles are bound together after sintering is likely to be maintained.

(C) If it is possible to maintain the state in which WC particles are sufficiently bound together after the cemented carbide has been sintered, the number of contact points at which the individual WC particles are in contact with other WC particles tends to increase, and the proportion of WC particles whose number of contact points with other WC particles is low tends to decrease.

Cemented carbides and cutting tools according to embodiments of the present invention will be described with reference to the drawings. It is intended that the present invention is not limited to the examples shown in the embodiments, but is determined by appended claims, and includes all variations of the equivalent meaning and ranges to the claims.

<Cemented Carbide>

<<Overview>>

A cemented carbide according to an embodiment of the present invention includes a hard phase containing, as a main component, WC and a binder phase containing, as a main component, an iron-group element. One of the characteristics of the cemented carbide is that the ratio B/A satisfies the formula $B/A \leq 0.05$, where A represents the number of WC particles, and B represents the number of WC particles whose number of contact points with other WC particles is 1 or less. The limitation of the ratio B/A realizes a cemented carbide having a small proportion of WC particles whose number of contact points with other WC particles is low. Description will be made below on the structure and production method of the cemented carbide according to the embodiment of the present invention.

<<Hard Phase>>

[Contact State Between WC Particles]

The ratio B/A within the specified range described above indicates that there are a low number of WC particles whose circumference is entirely surrounded with the binder phase (whose number of contact points is zero) or WC particles which are in contact with another WC particle at one point only, and that there are a high number of contact points between adjacent WC particles. At the contact points, as will be described later, it is considered that there are many portions where WC particles are rigidly bound together compared with existing cemented carbides. Accordingly, it is assumed that such a contact state between WC particles can improve plastic deformation resistance.

Figure 2:
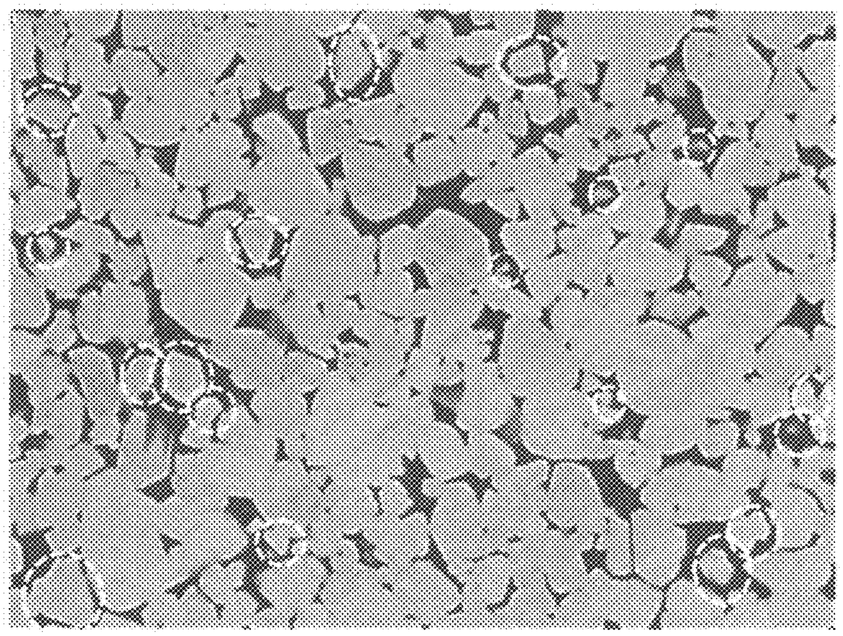
FIG. 2 is a scanning electron micrograph of a cross section of a cemented carbide according to a comparative example.

Specific examples of the contact state between WC particles will be described with reference to the drawings. FIG. 1 shows a photograph of a cemented carbide according to an embodiment in which the hard phase is composed of WC and the binder phase is composed of Co, and FIG. 2 shows a photograph of a cemented carbide according to a comparative example. In each of the photographs, a grey particle represents a WC particle, a black region seen among the particles represents Co, and a WC particle surrounded with a white broken line represents a WC particle whose number of contact points with other WC particles is 1 or less.

As shown in FIG. 1, in the cemented carbide according to the embodiment, there are a low number of WC particles whose number of contact points with other WC particles is 1 or less, and most of the WC particles have 2 or more contact points with other WC particles. In other words, a state exists in which WC particles divide the binder phase which is likely to plastically deform into smaller sections.

On the other hand, as shown in FIG. 2, in the cemented carbide according to the comparative example, there are many WC particles whose number of contact points with other WC particles is 1 or less. That is, there are many WC particles whose circumference is entirely surrounded with the binder phase and many portions where the binder phase continuously extends.

The term "contact point" refers to a portion where WC particles are in contact with each other without the binder phase therebetween in a planar structure of the cemented carbide. The contact point includes a portion where WC particles are merely in contact with each other and a portion where WC particles are bound together. The WC particles are preferably bound together in such a binding state that the liquid phase generated during sintering of the cemented carbide can be prevented from penetrating between WC particles. More specifically, diffusion of the constituent elements of individual particles may proceed at the interfaces between WC particles to form so-called necking. In the cemented carbide according to the embodiment, it is considered that a highest possible number of WC particles in the binding state contributes to improving plastic deformation resistance. The technique for obtaining such a rigid binding state will be described in detail later in the section "method of producing cemented carbide".

Regarding the number of contact points (hereinafter, may be referred to as the "contact point number" in some cases), as long as a WC particle is continuously in contact with an adjacent WC particle, the number of contact points is considered to be one regardless of the size thereof, and the contact point number is measured for each WC particle. For example, in a cross section of the cemented carbide, in a portion where adjacent WC particles are in point-like contact with each other, each contact portion is counted as one point, and a portion where adjacent WC particles are in line-like contact with each other is counted as one point. As will be described later, the cemented carbide according to the embodiment can contain, in addition to WC, hard phase particles other than WC. In such a case, WC particles can be in contact with hard phase particles other than WC. This contact is not between WC particles and, therefore, is not included in the contact point number.

The contact point number is measured, for example, as described below. Any surface or any cross section of the cemented carbide is subjected to mirror finishing to obtain an observation plane, and by observing the observation plane with a microscope, an observation image is obtained. By image analysis or the like using the observation image and a composition distribution image obtained by analysis (EDS surface analysis) with energy dispersive X-ray spectroscopy (EDS), hard phase particles are classified into WC particles and hard phase particles other than WC. After the classification, the contact point number of each WC particle is visually counted, and thus the contact point number can be measured. Examples of the type of microscope include a metallographic microscope and a scanning electron microscope (SEM). In particular, in the case where hard phase particles other than WC are included, it is preferable to use an observation image by a microscope and EDS surface analysis. The reason for this is that even in the case where hard phase particles other than WC are included, it is possible to easily measure the contact point number between WC particles. In the case where the hard phase contains WC only, contact points may be visually counted from an observation image obtained by an optical microscope. Examples of the portion to be used as the observation plane include a portion particularly required to have excellent plastic deformation resistance when the cemented carbide according to the embodiment is formed into a tool, such as an edge.

It is preferable to set the number of particles (A) of WC particles per field of view of the observation image to be 450 to 550. The specific observation magnification to set the number of particles (A) in the range described above, which depends on the average particle diameter of WC particles or the like, may be 80 to 10,000 times in the case of an SEM and 750 to 1,500 times in the case of a metallographic microscope.

The ratio B/A is preferably determined by measuring ratios B/A of a plurality of fields of view and using the average value of the measured ratios B/A of the fields of view. More specifically, the number of fields of view is preferably set to be 5 or more. The reason for this is that the number of particles (A) and the number of particles (B) of WC particles, and thus the ratio B/A can be more accurately measured. In the case where the ratio B/A is determined as the average value of a plurality of fields of view, the plurality of fields of view may be set in one observation plane, or the plurality of fields of view may be set in a plurality of observation planes.

The ratio B/A is 0.05 or less, and is preferably 0.03 or less, or 0.01 or less. In particular, preferably, there are substantially no WC particles whose number of contact points with other WC particles is 1 or less, i.e., substantially all the WC particles have 2 or more contact points with other WC particles.

Examples of the mirror finishing method include a method of polishing with diamond paste, a method using a focused ion beam (FIB) system, a method using a cross section polisher (CP) device, and a combination of these methods. In particular, in the case where an observation image is obtained by a metallographic microscope, when the observation image is obtained after etching an observation plane with Murakami's reagent, subsequent measurement is easily performed, which is preferable.

[Composition]

(Proportion of Hard Phase in Cemented Carbide)

The proportion of the hard phase in the cemented carbide may be 80% by mass or more, or 90% by mass or more relative to the entire cemented carbide. On the other hand, the proportion of the hard phase in the cemented carbide may be 96% by mass or less, or 95% by mass or less relative to the entire cemented carbide.

(Proportion of WC)

The hard phase contains WC as a main component, which means that WC is contained at a ratio of 50% by mass or more in the hard phase. The proportion of WC may be, for example, 70% by mass or more, 75% by mass or more, 80% by mass or more, or 85% by mass of the hard phase. In the case where the hard phase contains other components described below, the proportion of WC may be 98% by mass or less, or 95% by mass or less.

(Proportion of Other Components)

The hard phase can contain components other than WC. The proportion of other components in the hard phase may be 2% by mass or more, 5% by mass or more, or 8% by mass or more in the hard phase. When the hard phase contains components other than WC, for example, an improvement in wear resistance can be anticipated. On the other hand, the proportion of other components in the hard phase may be 50% by mass or less, or 30% by mass or less in the hard phase. The reason for this is that the proportion of WC relatively decreases and the ratio B/A can be suppressed from exceeding 0.05.

(Examples of Other Components)

Examples of the components other than WC include carbides (excluding WC), nitrides, and carbonitrides of at least one element selected from the group consisting of Group 4, 5, and 6 elements of the periodic table and silicon (Si). Examples of the Group 4, 5, and 6 elements of the periodic table include titanium (Ti), V (vanadium), Cr (chromium), zirconium (Zr), niobium (Nb), tantalum (Ta), tungsten (W), and the like. Specific examples of the other components include niobium carbide (NbC), tantalum carbide (TaC), titanium carbide (TiC), vanadium carbide (VC), trichromium dicarbide ($Cr_3C_2$), titanium nitride (TiN), titanium carbonitride (TiCN), zirconium carbonitride (ZrCN), and the like.

In particular, the cemented carbide preferably includes, as the hard phase, a composite compound phase composed of at least one composite compound selected from carbides, nitrides, and carbonitrides containing W and one or more elements selected from Group 4, 5, and 6 elements of the periodic table, excluding W, and Si. Examples of the Group 4, 5, and 6 elements include Ti, V, Cr, Zr, Nb, Ta, and the like. Specific examples of the composite compound include (W, Ti)C, (W, Ti)N, (W, Ti)(C, N), (W, Ti, Mo)C, (W, Ti, Mo)N, (W, Ti, Mo)(C, N), (W, Ti, Nb)C, (W, Ti, Nb)N, (W, Ti, Nb)(C, N), (W, Ti, Mo, Nb)(C, N), (W, Ti, Mo, Nb, Zr)(C, N), (W, Cr)C, (W, Cr)N, (W, Cr)(C, N), (W, Ti, Ta)C, (W, Ti, Ta)N, (W, Ti, Ta)(C, N), (W, Nb, Ta)C, (W, Nb, Ta)N, (W, Nb, Ta)(C, N), (W, Zr)C, (W, Zr)N, (W, Zr)(C, N), and the like.

When the W-containing composite compound phase is present in the cemented carbide, strength can be improved at the interfaces between W-containing composite compound particles and WC particles, and the strength of the cemented carbide can be improved. The reason for this is that the bonding strength between W-containing composite compound particles and WC particles is higher than the bonding strength between WC particles.

Following are two patterns for the generation process of the composite compound phase. In the first pattern, in the case where compound powders containing the individual constituent elements of the composite compound or powders of the individual constituent elements are used as starting material powders, the constituent elements of the individual powders are dissolved in the binder phase and combined together during sintering, and are precipitated as a composite compound phase by subsequent cooling. Control of the composite compound phase by precipitation can be performed, for example, by controlling the types, combinations, and contents of the constituent elements of the individual powders and by controlling the cooling rate after sintering. In the first pattern, for example, in the case where a WC powder, a TiC powder, and a Co powder are used as starting material powders, WC and TiC may be dissolved and combined together during sintering to be precipitated as (W, Ti)C. The (W, Ti)C is a composite compound.

In the second pattern, in the case where a composite compound powder is used as a starting material powder, the starting material powder are present while maintaining its form after sintering. In the second pattern, for example, in the case where a WC powder, a (W, Ti)C powder, and a Co powder are used as starting material powders, when the (W, Ti)C powder content is particularly excessive, the (W, Ti)C powder may be present while maintaining its form after sintering. The (W, Ti)C is a composite compound.

[Average Particle Diameter]

The average particle diameter of all the particles constituting the hard phase is preferably 1.5 μm or more, or 3 μm or more. The reason for this is that the toughness of the cemented carbide can be enhanced. On the other hand, the average particle diameter of all the particles constituting the hard phase is preferably 9 μm or less, or 6 μm or less. The reason for this is that the hardness of the cemented carbide can be enhanced. Herein, the average particle diameter refers to the Feret's diameter.

The average particle diameter of all the particles constituting the hard phase and the average particle diameter of the WC particles can be measured by image analysis or the like using an observation image obtained by observing an observation plane with a microscope and EDS surface analysis, as in the method of measuring contacts points and the number thereof described above. Each of the average particle diameters is preferably an average value of the values obtained in a plurality of fields of view, in particular, 5 or more fields of view.

[Area Fraction]

In the Case where the Composite Compound Phase is included as the Hard Phase, the area fraction of the composite compound phase relative to any surface or cross section of the cemented carbide may be 1% to 10%. When the area fraction of the composite compound phase is 1% or more, binding between W-containing composite compound particles and WC particles can be secured to a certain extent, and the strength of the cemented carbide can be improved. On the other hand, when the area fraction of the composite compound phase is 10% or less, WC particles can be sufficiently secured, and it is possible to achieve both an improvement in plastic deformation resistance due to binding between WC particles and an improvement in strength due to binding between W-containing composite compound particles and WC particles. The area fraction of the composite compound phase is more preferably 3% to 8%, in particular, 4% to 7.5%.

The size of each composite compound phase portion may be 1 $\mu m^2$ or more and less than 10 $\mu m^2$. Regarding the composite compound phase portion present in any surface or any cross section of the cemented carbide, when the area thereof is 1 $\mu m^2$ or more, binding to WC particles is likely to occur, and strength is likely to be improved. On the other hand, when the area of the composite compound phase portion is large, the composite compound phase portion is likely to act as a starting point for breakage, which can cause a decrease in fracture resistance. Therefore, when the area of the composite compound phase portion is less than 10 $\mu m^2$, it is possible to decrease the starting point for breakage. The size of the composite compound phase portion is more preferably 2 to 9 $\mu m^2$, in particular, 3 to 8 $\mu m^2$.

Even if a composite compound phase portion with an area of 10 $\mu m^2$ or more exists, when the existence ratio thereof is less than 5%, the starting point for breakage can be decreased and, therefore, a decrease of fracture resistance can be suppressed. The existence ratio of the composite compound phase portion with an area of 10 $\mu m^2$ or more is preferably less than 3%, or less than 2%. In particular, preferably, the composite compound phase portion with an area of 10 $\mu m^2$ or more does not substantially exist.

The area, area fraction, and existence ratio of the composite compound phase portion can be measured by image analysis or the like using an observation image obtained by observing an observation plane with a microscope and EDS surface analysis, as in the method of measuring the contact point number between WC particles described above. One field of view of the observation image is preferably set such that the total of the number of WC particles and the number of W-containing composite compound particles is 450 to 550. Each of the area fraction and the existence ratio is preferably an average value of the values obtained in a plurality of fields of view, in particular, 5 or more fields of view.

<<Binder Phase>>

The binder phase contains, as a main component, an iron-group element, which means that the iron-group element is contained at a ratio of 50% by mass or more relative to the entire binder phase. Examples of the iron-group element constituting the binder phase typically include Co, nickel (Ni), iron (Fe), and the like. These may be used alone or in combination of two or more. Furthermore, the binder phase may contain W and carbon (C) which are components of the hard phase, the other components described above, and other unavoidable components.

The binder phase may contain at least one of Cr and V. These elements originate from a grain growth inhibitor and the like which are optionally used during production of the cemented carbide and can be contained in the binder phase. When these elements are present in the binder phase, it is considered that they exist in the form of being dissolved in the binder phase.

The content of the binder phase in the cemented carbide is preferably 4% by mass or more, or 6% by mass or more. The reason for this is that the deterioration of sinterability during production is prevented, the hard phase is rigidly bound by the binder phase and, therefore, a cemented carbide which has high strength and in which fracture is unlikely to occur can be produced. Furthermore, when the content of the binder phase is 4% by mass or more, the toughness of the cemented carbide is improved. In particular, the Co content in the cemented carbide is preferably 6% by mass or more, or 8% by mass or more. The reason for this is that a cemented carbide in which fracture is unlikely to occur can be easily obtained. On the other hand, in the cemented carbide, as the content of the binder phase increases, plastic deformation resistance tends to decrease. In the cemented carbide according to the embodiment, since the ratio B/A satisfies the formula described above, in the case where the content of Co mainly constituting the binder phase is high to a certain extent, for example, for example, even in the case where the cemented carbide contains 8% by mass or more of Co, excellent plastic deformation resistance is exhibited. Accordingly, even when the content of Co is increased to a certain extent in order to improve fracture resistance, it is possible to produce a cemented carbide having certain plastic deformation resistance. The content of the binder phase is preferably 20% by mass or less, or 10% by mass or less. The reason for this is that decreases in hardness and plastic deformation resistance due to a relative decrease of the hard phase can be suppressed.

<<Effects and Advantages>>

The cemented carbide according to the embodiment described above has excellent plastic deformation resistance because the ratio B/A satisfies the formula $B/A \leq 0.05$. For example, in the case where the cemented carbide according to the embodiment is used for a cutting tool, the life of the cutting tool can be increased 2 or more times, or 4 or more times that of a cutting tool in which the formula $B/A \leq 0.05$ is not satisfied. Furthermore, the cemented carbide according to the embodiment can be suitably used in the application, in particular, requiring plastic deformation resistance, such as a material for dies.

<Method of Producing Cemented Carbide>

<<Overview>>

The cemented carbide according to the embodiment of the present invention in which the ratio B/A satisfies the formula $B/A \leq 0.05$ can be produced, for example, by a method of producing a cemented carbide including a preparation step, a mixing step, a forming step, a calcination step, and a sintering step. A feature of the production method is to perform a calcination step.

<<Preparation Step>>

In the preparation step, all starting material powders for the materials constituting a cemented carbide are prepared. Examples of the powders to be prepared include a WC powder and a binder phase powder as essential powders, and include, according to need, a hard phase powder other than WC, a grain growth inhibitor, and the like. Commercially available powders can be used for these starting material powders.

The average particle diameter of the individual starting material powders is not particularly limited, and may be set, for example, in the range of 0.5 to 10 μm. The average particle diameter of the individual starting material powders refers to the average particle diameter (FSSS diameter) determined by the Fisher sub-sieve sizer (FSSS) method. In general, as the average particle diameter of the WC powder used as a starting material decreases, the average particle diameter of WC particles in the resulting cemented carbide decreases. As the average particle diameter of the WC powder increases, the average particle diameter of WC particles in the cemented carbide increases. The average particle diameter of the WC powder may be, for example, 1.5 to 6.0 μm, or 2.0 to 5.0 μm. The average particle diameter of the binder phase powder may be 0.5 to 3.0 μm, or 0.8 to 1.6 μm.

<<Mixing Step>>

In the mixing step, the individual starting material powders prepared in the preparation step are mixed. By performing the mixing step, a mixed powder in which the individual starting material powders are mix is produced. A known apparatus can be used in the mixing step, and for example, an attritor, rolling ball mill, bead mill, or the like may be used. The mixing conditions may be known conditions, and either wet mixing or dry mixing may be performed. In one example, in the case where an attritor is used, the mixing conditions are as follows: number of revolutions: 30 to 500 rpm, and mixing time: 30 to 900 minutes. Mixing with the attritor may be performed by using ball-like media made of a cemented carbide or without using media.

After the mixing step, as necessary, the mixed powder may be granulated. The reason for this is that by granulating the mixed powder, the mixed powder is easily charged into a die, metal mold or the like in the forming step describe below. In the granulation, a known granulating method can be used, and for example, a commercially available granulator, such as a spray dryer, may be used.

<<Forming Step>>

In the forming step, the mixed powder is formed into a predetermined shape. A formed body formed from the mixed powder is obtained by the forming step. As the forming method and forming conditions in the forming step, a commonly used method and conditions may be employed. Examples of the forming method include a dry pressing method, a cold isostatic pressing method, an injection molding method, an extrusion method, and the like. In one example of the forming conditions, the load is set to be 50 to 200 MPa. The predetermined shape may be, for example, a cutting tool shape. In this case, in order to obtain a final product shape, as necessary, appropriate machining may be performed after the calcination step or after the sintering step.

<<Calcination Step>>

In the calcination step, the formed body obtained by the forming step is heat-treated under conditions in which a liquid phase of the binder phase is not generated, and as many as possible WC particles can be more rigidly bound together. A preliminarily fired body, in which the number of contact points at which the individual WC particles are in contact with other WC particles is high, is obtained by the calcination step. The calcination step can be performed with a known apparatus, such as a commercially available sintering furnace. The condition for the calcination step (hereinafter, referred to as the "heat treatment conditions"), such as the holding temperature for the heat treatment and the holding time in which the formed body is held, will be described below.

[Heat Treatment Conditions]

(Holding Temperature)

The predetermined temperature in the calcination step is equal to or higher than the temperature at which as many as possible WC particles can be rigidly bound together. It is considered that, by holding the formed body at this temperature or higher, sufficient binding between WC particles is promoted, and the number of contact points at which the individual WC particles are in contact with other WC particles increases. Thereby, it is possible to prevent the liquid phase generated in the sintering step, which will be described later, from penetrating between WC particles. On the other hand, the predetermined temperature is lower than the liquidus temperature of the binder phase. By holding the formed body at the temperature lower than the liquidus temperature of the binder phase, it is possible to prevent the liquid phase from penetrating contact interfaces at which WC particles are merely in contact with each other, and a state in which WC particles are separated from each other is unlikely to occur. Therefore, it is considered that in the preliminarily fired body, and further the cemented carbide according to the embodiment, the number of contact points between WC particles increases. Specifically, the temperature may be, for example, 1,100° C. to 1,200° C., or 1,150° C. to 1,200° C.

(Holding Time)

The holding time in which the formed body is held at the predetermined temperature should be a sufficient time for binding the individual WC particles together such that it is possible to prevent the liquid phase generated in the sintering step, which will be described later, from penetrating between WC particles, and the holding time, together with the predetermined temperature, may be appropriately adjusted. For example, the holding time may be 300 minutes or more, or 500 minutes or more. The upper limit of the holding time is not particularly set, but by setting the upper limit to be 1,100 minutes or less, or 900 minutes or less, in particular, 600 minutes or less, excellent productivity can be achieved.

(Atmosphere)

The atmosphere in which the calcination step is performed is not particularly limited, and the calcination step can be performed in an atmosphere of air, nitrogen, inert gas, reducing gas, or the like, or in vacuum (about 0.1 to 0.5 Pa). When the calcination step is performed in a non-oxidizing atmosphere, oxidation of WC and the like can be prevented, which is preferable. The same also applies to the sintering step described below.

<<Sintering Step>>

In the sintering step, the preliminarily fired body obtained in the calcination step is held, for a predetermined time, in a temperature range in which a liquid phase of the binder phase is generated to produce a sintered cemented carbide. By the sintering step, a cemented carbide according to the embodiment in which the formula $B/A \leq 0.05$ is satisfied can be obtained. The sintering step can be performed by using a commonly used apparatus, such as a sintering furnace. As the conditions for the sintering step, known conditions can be applied. The temperature range in which a liquid phase is generated may be, for example, 1,300° C. to 1,600° C., or 1,350° C. to 1,500° C. The predetermined time may be, for example, 0.5 to 2.0 hours, or 1.0 to 1.5 hours.

In the case where the composite compound phase is included as the hard phase, for example, in the case where compound powders containing the individual constituent elements of the composite compound or powders of the individual constituent elements are used as starting material powders, the constituent elements of the individual powders are dissolved in the binder phase and combined together to be precipitated by subsequent cooling. In the case where the composite compound phase is generated by precipitation, after heating by the sintering step, cooling may be performed to 1,200° C. at a cooling rate of 10° C./min or less. The cooling rate may be set to be 8° C./min or less. Furthermore, cooling may be performed to 1,300° C. to 1,150° C. at a rate of 5° C./min or less, or to 1,250° C. to 1,200° C. at a rate of 3° C./min or less.

<<Effects and Advantages>>

According to the method of producing a cemented carbide described above, it is possible to produce a cemented carbide according to the embodiment in which the proportion of WC particles whose number of contact points is low is small, and which has excellent plastic deformation resistance.

<Cutting Tool>

<<Substrate>>

A cutting tool according to an embodiment of the present invention is a cutting tool in which the cemented carbide in which the formula $B/A \leq 0.05$ is satisfied is used as a substrate. Accordingly, the cutting tool according to the embodiment of the present invention has excellent plastic deformation resistance.

The cutting tool is not particularly limited. Examples of the cutting tool include bits, ball mills, end mills, drills, reamers, and the like. In particular, regarding bits and the like, an indexable insert may be mentioned as an example.

<<Hard Coating>>

The cutting tool according to the embodiment may be provided with a hard coating on the substrate. By forming the hard coating on the substrate, wear resistance and the like can be improved. Furthermore, from the viewpoint of improvement in wear resistance due to the hard coating and excellent plastic deformation resistance of the substrate, it is expected that, in particular, flank face wear can be easily suppressed. Furthermore, since the hard coating is formed on the substrate, chipping is unlikely to occur on an edge of the substrate and therefore, it is expected that the state of a machined surface of a workpiece can be improved. In particular, since the cemented carbide having excellent plastic deformation resistance according to the embodiment is used as a substrate in the cutting tool according to the embodiment, the hard coating is unlikely to be separated from the substrate. Accordingly, it is possible to produce a cutting tool for more highly efficient machining and provided with a longer life. The hard coating preferably covers a portion serving as an edge and its vicinity in the substrate, and may cover the entire surface of the substrate.

Examples of constituent materials for the hard coating include carbides, nitrides, oxides, and borides of one or more elements selected from Group 4, 5, and 6 metals of the periodic table, aluminum (Al), and Si, and solid solutions thereof. For example, Ti(C, N), $Al_2O_3$, (Ti, Al)N, TiN, TiC, (Al, Cr)N, and the like may be used. In addition, cubic boron nitride (cBN), diamond-like carbon, and the like are also suitable as the composition of the hard coating. Such a hard coating can be formed by a known gas phase method, such as a chemical vapor deposition (CVD) method or physical vapor deposition (PVD) method. The hard coating formed by the gas phase method has excellent adhesion with the substrate and therefore, can meet the demand for highly efficient machining and prolonged life. Examples of the CVD method include a plasma CVD method, a thermal CVD method, and the like. Examples of the PVD method include a cathode arc ion plating method, a sputtering method, and the like.

The hard coating may be formed of a single layer or multiple layers. The total thickness of the hard coating is preferably 1 to 20 gum, and more preferably 1.5 to 15 μm.

<<Example of Cutting Tool>>

Figure 3:
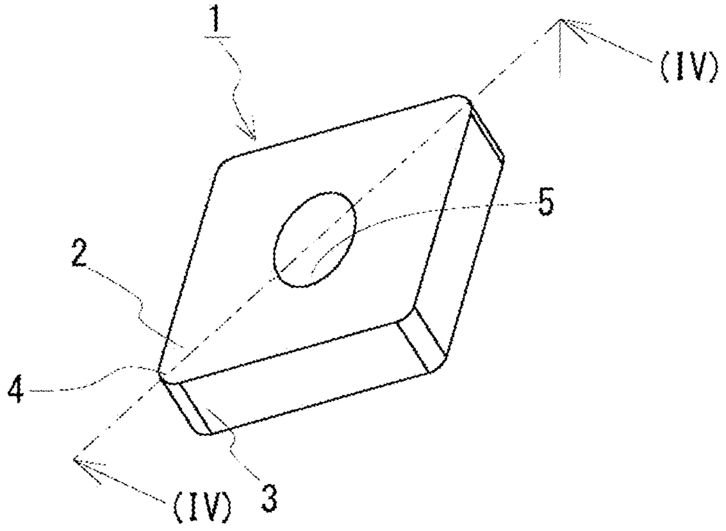
FIG. 3 is a schematic perspective view of an indexable insert which is an example of a cutting tool according to an embodiment of the present invention.
Figure 4:
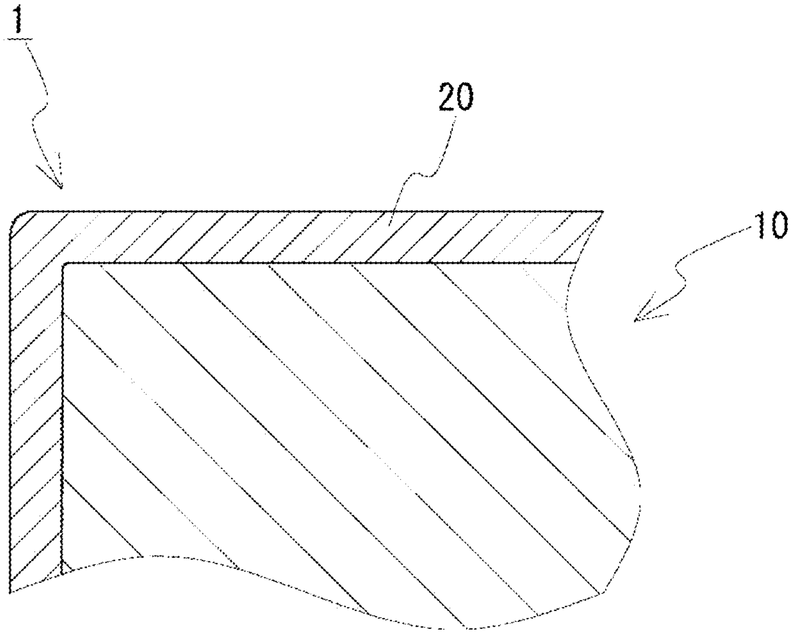
FIG. 4 is a partially enlarged schematic cross-sectional view showing the vicinity of an edge in a (IV)-(IV) cross section of FIG. 3.

As an example of the cutting tool according to the embodiment, an indexable insert is shown in FIG. 3. An indexable insert 1 is a piece having a substantially rhombic shape, and as shown in FIG. 4, includes a substrate 10 made of a cemented carbide, and a hard coating 20 covering a surface of the substrate 10. The substrate 10 is the cemented carbide according to the embodiment described above. As shown in FIG. 3, the indexable insert 1 has a rake face 2, a flank face 3, a cutting edge (edge) 4, and a mounting hole 5. For example, in the case of a bit, such an indexable insert 1 is used while being fixed on an appropriate shank.

Test Example 1

In Test Example 1, cutting tools were fabricated in which produced cemented carbides were used as substrates, and evaluations thereof were carried out.

<<Production of Samples>>

As starting material powders, a WC powder (average particle diameter: 3.8 μm), a Co powder (average particle diameter: 1.0 μm), and a TaC powder (average particle diameter: 1.5 μm) were prepared (preparation step). The average particle diameters written with the starting material powders are average particle diameters determined by the FSSS method. The same also applies to Test Example 2 which will be described later. Then, the WC powder, the Co powder, and the TaC powder were mixed at a mass ratio of 88:9:3 by using a commercially available attritor to obtain a mixed powder (mixing step). The mixing conditions were as follows: 200 rpm and 6 hours (360 minutes). The mixed powder was formed by pressing into a CNMG120408N-GU shape, and a plurality of formed bodies were obtained (forming step). Some of the formed bodies were subjected to a calcination step under various conditions shown in Table 1 to thereby obtain preliminarily fired bodies. The preliminarily fired bodies and the formed bodies which were not subjected to the calcination step were each sintered under the conditions of a temperature of 1,380° C. and a time of one hour to thereby obtain cemented carbides (sintering step). These cemented carbides were used as samples. For each sample, a plurality of cemented carbides were produced for the purpose of observation of the structure, measurement of the Young's modulus, and a cutting test.

<<Observation of Structure>>

[Formation of Observation Plane]

Regarding each sample, any cross section or surface was subjected to mirror finishing, and then, the machined layer of the cross section or surface was removed by argon (Ar) ion beam processing. The cross section or the surface was used as an observation plane.

[Photographing with SEM]

The observation plane of each sample was photographed with a SEM to obtain a backscattered electron image as an observation image. Five fields of view were photographed for each sample. The number of particles per field of view was set to be about 500.

[EDS Surface Analysis]

The elements which were expected to emerge from the mixture composition were selected as analysis targets, and EDS surface analysis was performed in the same fields of view as those of the backscattered electron images. Thereby, composition distribution images were obtained. Here, W, Ta, and Co were selected as elements to be analyzed from the compositions of the starting material powders used for each sample. In the case where starting material powders contain TiC and $Cr_3C_2$, Ti and Cr may be added to the analysis target. Although light elements, such as C and nitrogen (N) may be included in the analysis target, it is difficult to identify light elements with the energy resolution of EDS in many cases, and the light elements were not selected in this test example.

[Classification of Hard Phase Particles]

Comparison was made between the obtained backscattered electron images and composition distribution images, and a hard phase in which distribution of W only was observed was classified as WC, and a hard phase in which distribution of other elements (e.g., Ta) was observed was classified as other than WC.

[Measurement of Contact Point Number]

By using the backscattered electron images and the composition distribution images, the number of particles (A) and the number of particles (B) in each of the fields of view of each sample were visually measured, and the ratio B/A was obtained. The average B/A value was calculated for each sample. In all the fields of view, the number of particles (A) per field of view was 450 to 550. The average B/A value in each sample is shown in Table 1.

[Average Particle Diameter of WC Particles]

By using the backscattered electron images and the composition distribution images, the average particle diameter (Feret's diameter) of WC particles in each of the fields of view in each sample was determined by an image analysis software (manufactured by Mountech Co., Ltd.; Mac-View). Then, the average value of the average particle diameters in each sample was calculated. As a result, in all the samples, the average value of the average particle diameters of WC particles was 3.3 μm.

<<Plastic Deformation Resistance>>

Characteristics of each of the samples were evaluated. Specifically, the Young's modulus and life as a cutting tool of each of the samples were evaluated.

[Young's Modulus]

The Young's modulus of each of the samples were obtained by measuring, with a commercially available high-temperature dynamic elastic modulus measuring apparatus (probe: 5 MHz), the sound velocity of the longitudinal wave and the sound velocity of the transverse wave by the ultrasonic pulse technique. The sample with a higher Young's modulus has higher rigidity and is less likely to plastically deform. The measurement results are shown in Table 1.

[Cutting Test]

Each of the samples was subjected to a cutting test under the cutting conditions shown in Table 2. The time during which the wear of the sample proceeded, resulting in fracture of the substrate was defined as a life. The results of the cutting test are shown in Table 1.

TABLE 1

| Sample No. | Heat treatment conditions in calcination step: Holding temperature (° C.) | Holding time (min) | B/A | Young's modulus (GPa) | Life (min) |
|---|---|---|---|---|---|
| 1-1 | 1180 | 550 | 0.005 | 580 | 14 |
| 1-2 | 1180 | 330 | 0.016 | 575 | 13 |
| 1-3 | 1140 | 550 | 0.022 | 576 | 12 |
| 1-4 | 1140 | 330 | 0.036 | 570 | 13 |
| 1-11 | 1180 | 60 | 0.080 | 560 | 5 |
| 1-12 | 1300 | 550 | 0.102 | 559 | 4 |
| 1-13 | 1070 | 550 | 0.073 | 562 | 3 |
| 1-14 | None | None | 0.095 | 555 | 3 |

TABLE 2

| Testing conditions | |
|---|---|
| Workpiece | S45C (Round bar without groove) |
| Cutting speed Vc (m/min) | 350 |
| Feed rate f (mm/rev) | 0.30 |
| Depth of cut ap (mm) | 0.5 |
| Cutting environment | WET |
| Evaluation method | Time until fracture (min) |

<<Results>>

As shown in Table 1, regarding Samples 1-1 to 1-4 in which the ratio B/A is 0.05 or less, the Young's modulus is 565 GPs or more, in particular, 570 GPa or more, which indicates high plastic deformation resistance. Furthermore, it is clear that Samples 1-1 to 1-4 have a longer life as a cutting tool than Samples 1-11 to 1-14 in which the ratio B/A exceeds 0.05. As is evident from the above, the plastic deformation resistance of a cemented carbide affects the life when formed into a cutting tool. The reason for this will be described with reference to FIG. 4 which shows part of a longitudinal cross section of a ridgeline portion of a cutting edge. When the plastic deformation resistance of a cemented carbide 10 serving as a substrate of a cutting tool 1 is low, as cutting proceeds, the edge side of the rake face (upper left side in FIG. 4) becomes inclined downward, and the edge side of the flank face protrudes forward (left side in FIG. 4). As a result, the protruding portion comes into contact with a workpiece to cause flank face wear. In such a manner, there is a close relationship between plastic deformation resistance and flank face wear. In the substrate, it is considered that minute cracks and the like occur around the edge due to plastic deformation, and the development of the cracks leads to fracture. Accordingly, the plastic deformation resistance of the cemented carbide serving as the substrate affects the life of the cutting tool.

It is evident that such a cemented carbide having excellent plastic deformation resistance can be produced by setting the heat treatment conditions in the calcination step as follows: temperature: 1,100° C. to 1,200° C., and time: 300 to 600 minutes.

Test Example 2

In Test Example 2, the influences of the average particle diameter of WC particles in the produced cemented carbide and the Co content in the cemented carbide on plastic deformation resistance were evaluated.

<<Production of Samples>>

[Production of Cemented Carbide]

(Sample 2-1)

A cemented carbide, as Sample 2-1, was produced as in Sample 1-1 of Test Example 1 except that the mass ratio of the WC powder, the Co powder, and the TaC powder was set to be 88.5:8.5:3.0 and the mixed powder was formed into a SNGN 120408N-EG shape.

(Sample 2-2)

A cemented carbide, as Sample 2-2, was produced as in Sample 2-1 except that the mass ratio of the WC powder, the Co powder, and the TaC powder was set to be 89.5:7.5:3.0.

(Sample 2-3)

A cemented carbide, as Sample 2-3, was produced as in Sample 2-1 except that the average particle diameter of WC powder prepared in the preparation step was set to be 3.0 μm.

[Formation of Hard Coating]

A hard coating was formed by a known CVD method on each of the samples. The composition and thickness of the hard coating were TiN: 0.2 μm, MT-TiCN: 5.0 μm, TiBN: 0.4 μm, α-$Al_2O_3$: 5.2 μm, and TiN: 0.2 μm in this order from the substrate side. The above-described "MT" indicates that the coating was formed by a CVD method at a lower temperature than that for other hard coatings.

<<Analysis of Structure>>

The average value of the B/A ratios in five fields of view in each sample was obtained as in Test Example 1. The average particle diameter of WC particles in each of the fields of view in each sample was also obtained as in Test Example 1, and the average value of average particle diameters of WC particles in each sample was obtained. As a result, in all the samples, the ratio B/A was 0.05 or less. The average value of average particle diameters of WC particles after sintering in each sample is shown in Table 3. Here, the average particle diameter refers to the Feret's diameter.

<<Plastic Deformation Resistance>>

[Young's Modulus]

As in Test Example 1, the Young's modulus in each sample was measure. The results thereof are shown in Table 3.

[Cutting Test]

By carrying out a cutting test, the life of the cemented carbide was evaluated. The results of the cutting test are shown in Table 3, and the conditions for the cutting test are shown in Table 4.

TABLE 3

| Sample No. | WC:Co:TaC (mass ratio) | WC average particle diameter (μm) | Young's modulus (GPa) | Life (min) |
|---|---|---|---|---|
| 2-1 | 88.5:8.5:3.0 | 3.2 | 596 | 6 |
| 2-2 | 89.5:7.5:3.0 | 3.2 | 610 | 4 |
| 2-3 | 88.5:8.5:3.0 | 2.6 | 585 | 4 |

TABLE 4

| Testing conditions | |
|---|---|
| Workpiece | SUS316 (Round bar without groove) |
| Cutting speed Vc (m/min) | 180 |
| Feed rate f (mm/rev) | 0.30 |
| Depth of cut ap (mm) | 1.6 |
| Cutting environment | WET |
| Evaluation method | Time until fracture (min) |

<<Results>>

In all the samples, the Young's modulus is 580 GPa or more, which indicates high plastic deformation resistance. Comparison between Sample 2-1 and Sample 2-2, which have the same average particle diameter of WC particles, shows that Sample 2-1 has a lower Young's modulus, but has a longer life as the cutting tool. The reason for this is considered to be that, in Sample 2-1, since the Co content is 8% by mass or more, excellent fracture resistance is exhibited. Furthermore, comparison between Sample 2-1 and Sample 2-3, which have the same Co content, shows that Sample 2-1 has a longer life as the cutting tool. The reasons for this are considered to be that (1) Sample 2-1 has a higher Young's modulus than Sample 2-3, and (2) Sample 2-1 has a larger average particle diameter of WC particles (3 μm or more) than Sample 2-3 and therefore, the size of contact points is large. Consequently, excellent toughness, in particular, fracture resistance is exhibited. It is clear that Sample 2-1, in which the Co content is 8% by mass or more in the cemented carbide, and the average particle diameter of WC particles is 3 j m or more, has the longest life as the cutting tool.

Test Example 3

In Test Example 3, cemented carbides were produced by the same production method as that of Text Example 1, the cemented carbides further including, as the hard phase, a composite compound phase composed of a composite compound containing W. Cutting tools in which the cemented carbides were used as a substrate were produced and evaluated.

<<Production of Samples>>

As starting material powders, powders having the compositions shown in Table 5 were prepared (preparation step). The average particle diameters of the prepared powders are as follows: WC powder: 3.8 μm, Co powder: 1.0 μm, TiC powder: 3 μm, TaC powder: 1.5 μm, and TiN powder: 2 μm. The average particle diameters were determined by the FSSS method. Subsequently, as in Test Example 1, a mixing step, a forming step, a calcination step (heat treatment conditions shown in Table 5), and a sintering step were performed in this order to obtain cemented carbides (Sample Nos. 3-1 to 3-4, 3-11 to 3-13).

TABLE 5

| Sample | Composition mixing ratio (mass %) | | | | | Heat treatment conditions in calcination step | | Cooling conditions in sintering step | |
|---|---|---|---|---|---|---|---|---|---|
| | | | | | | Holding temperature | Holding time | Temperature control range | Cooling rate |
| No. | WC | Co | TiC | TaC | TiN | (° C.) | (min) | (° C.) | (° C./min) |
| 3-1 | 86.5 | 10 | 1 | 2.5 | — | 1180 | 400 | 1250~1200 | 2.5 |
| 3-2 | 86.5 | 10 | 1 | 2.5 | — | 1180 | 600 | 1300~1200 | 4.0 |
| 3-3 | 86.5 | 10 | — | 2.5 | 1 | 1180 | 400 | 1250~1180 | 3.5 |
| 3-4 | 88.5 | 9.5 | 1.5 | 0.5 | — | 1180 | 330 | 1280~1170 | 4.0 |
| 3-11 | 83.5 | 10.5 | 4 | 2 | — | 1180 | 550 | 1250~1200 | 100.0 |
| 3-12 | 86.5 | 10.5 | 0.5 | 2.5 | — | 1180 | 550 | 1300~1100 | 30.0 |
| 3-13 | 86.5 | 9 | 2 | 2.5 | — | 1180 | 700 | 1250~1200 | 25.0 |

<<Observation of Structure>>

Figure 5:
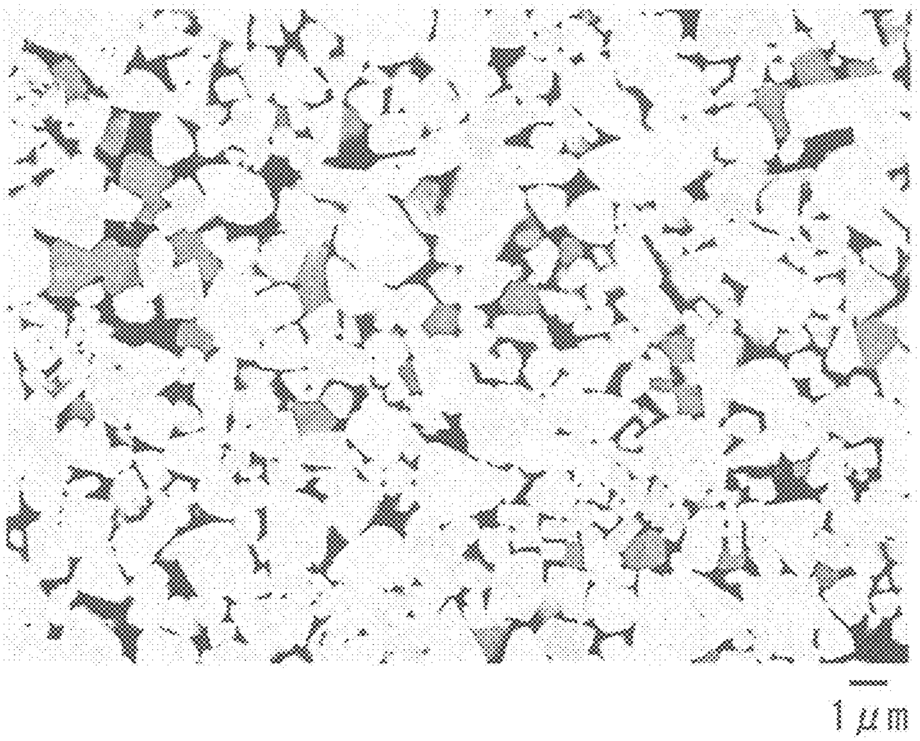
FIG. 5 is a scanning electron micrograph of a cross section of a cemented carbide (Sample No. 3-1) according to an embodiment of the present invention.

Regarding each sample, as in Test Example 1, a cross section was photographed with an SEM, and a backscattered electron image was obtained as an observation image. Five fields of view were photographed for each sample. The number of particles per field of view was set such that the total of the number of WC particles and the number of W-containing composite compound particles was about 500. As a representative sample, a photograph (magnification 5,000 times) of a cross section of Sample No. 3-1 is shown in FIG. 5. In FIG. 5, light grey represent WC particles, dark grey represents a composite compound phase composed of a W-containing composite compound, and the black region therebetween represents a binder phase. As shown in FIG. 5, a composite compound phase was present between WC particles. As a result of EDS surface analysis, the composite compound phase was identified as a composite compound of (W, Ti, Ta)C, N). Regarding other samples, it was also confirmed that a composite compound phase is present between WC particles.

[Measurement of WC Particles]

For each sample, by using the backscattered electron image and the composition distribution image, the contact state between WC particles was measured as in Test Example 1. The average B/A value of each sample is shown in Table 7. Furthermore, by using the observation image and the composition distribution image, the average particle diameter of WC particles in each sample was determined as in Test Example 1. As a result, in all the samples, the average particle diameter of WC particles was 2.4 μm.

[Measurement of Composite Compound Phase]

For each sample, by using the observation image and the composition distribution image, the area of each composite compound phase portion was measured by an image measurement software Mac-View. Then, the ratio of the total area of the composite compound phase portions to the observation image (area fraction) was calculated. The area fraction was calculated in accordance with the formula (total area of composite compound phase portions/area of observed field of view)×100. The results thereof (the average value of values of the fields of view in each sample) are shown in Table 7. Furthermore, the existence ratio of a composite compound phase portion with an area of 10 $\mu m^2$ or more in the entire composite compound phase present in the observation image was calculated. The existence ratio was calculated in accordance with the formula (number of composite compound particles with an area of 10 $\mu m^2$ or more/total number of composite compound particles)×100. The results thereof (the average value of values of the fields of view in each sample) are also shown in Table 7.

<<Cutting Test>>

A hard coating was formed on each of the samples as in Test Example 2. The composition of the hard coating was set to be TiN (0.2 μm), MT-TiCN (5.0 μm), TiBN (0.4 μm), $\alpha$-$Al_2O_3$ (5.2 μm), and TiN (0.2 μm) in this order from the substrate (sample) side. The numerical value in parentheses shows the thickness of each coating. Each of the samples provided with the hard coating was subjected to a cutting test under the cutting conditions shown in Table 6. The time until fracture of the substrate was measured as a life. The results there of are also shown in Table 7.

TABLE 6

| | Testing conditions |
|---|---|
| Workpiece | S35C (Round bar without groove) |
| Cutting speed Vc (m/min) | 250 |
| Feed rate f (mm/rev) | 0.50 |
| Depth of cut ap (mm) | 1.5 |
| Cutting environment | WET |
| Evaluation method | Time until fracture (min) |

TABLE 7

| | | Composite compound phase | | |
|---|---|---|---|---|
| Sample No. | B/A | Area fraction (%) | Existence ratio (%) | Life (min) |
| 3-1 | 0.016 | 5.5 | 2.5 | 17 |
| 3-2 | 0.013 | 6.6 | 3.3 | 14 |
| 3-3 | 0.011 | 8.3 | 1.1 | 13 |
| 3-4 | 0.022 | 2.7 | 4.2 | 14 |
| 3-11 | 0.021 | 11.0 | 3.3 | 9 |
| 3-12 | 0.030 | 0.7 | 2.0 | 10 |
| 3-13 | 0.024 | 7.1 | 6.2 | 8 |

<<Results>>

As shown in Table 7, when the ratio B/A is 0.05 or less, Sample Nos. 3-1 to 3-4, in which the composite compound phase satisfies the conditions: (1) an area fraction of 1% to 10% and (2) an existence ratio of less than 5%, have a longer life as the cutting tool than Sample Nos. 3-11 to 3-13, in which at least one of (1) and (2) is not satisfied. The reason for this is considered to be that, in Sample Nos. 3-1 to 3-4, since the area fraction satisfies (1) above, the composite compound phase is moderately bound to WC particles, and since the existence ratio satisfies (2) above, the amount of the composite compound phase portion that can be a starting point for breakage is small. In Sample Nos. 3-1 to 3-4, the total content of the hard phase powders other than WC (TiC powder, TaC powder, and TiN powder) as starting material powders is suitably set, and after sintering, cooling is performed at a cooling rate of 10° C./min or less. Therefore, it is considered that the composite compound phase satisfying both (1) and (2) above is generated by precipitation.

In particular, Sample No. 3-1 in which the area fraction is 5.5%, the life is longer. The reason for this is considered to be that because of the existence of the composite compound phase, strength can be improved, and since a sufficient amount of WC particles is present, and adjacent WC particles are sufficiently bound together, the plastic deformation resistance can be improved. In Sample No. 3-1, it is considered that since the cooling rate after sintering is low at 2.5° C./min, precipitation is promoted, and composite compound phase portions with a proper size are precipitated between WC particles.

In Sample No. 3-11, it is considered that since the content of hard phase powders other than WC is higher than that of Sample Nos. 3-1 to 3-4, the composite compound phase is likely to be precipitated, and the area fraction increases to 11% (not satisfying (1) above). However, in Sample No. 3-11, it is considered that since the cooling rate after sintering is very high at 100° C./min, even if the area fraction increases, coarsening of each composite compound phase portion is suppressed, and the existence ratio decreases to 3.3% (satisfying (2) above). In Sample No. 3-12, it is considered that although the content of hard phase powders other than WC is substantially the same as that of Sample Nos. 3-1 to 3-4, since the cooling rate after sintering is high at 30° C./min, precipitation of the composite compound phase is suppressed, and the area fraction decreases to 0.7% (not satisfying (1) above). In Sample No. 3-13, it is considered that since the content of hard phase powders other than WC is higher than that of Sample Nos. 3-1 to 3-4, the composite compound phase is likely to be precipitated; however, since the cooling rate after sintering is higher than that of Sample Nos. 3-1 to 3-4, the amount of precipitation is proper, resulting in an area fraction of 7.1% (satisfying (1) above). However, in Sample No. 3-13, it is considered that although the content of hard phase powders other than WC is high, the cooling rate is lower than that of Sample No. 3-11, each composite compound phase portion coarsens, and the existence ratio increases to 6.2% (not satisfying (2) above).

From the results described above, it is considered that in order to precipitate a proper amount of the composite compound phase portion having a proper size between WC particles, the content of hard phase powders other than WC and the cooling rate after sintering should be controlled.

INDUSTRIAL APPLICABILITY

The cemented carbide of the present invention has excellent plastic deformation resistance and therefore, can be suitably used as a material for cutting tools, dies, and the like. Furthermore, in the cutting tool of the present invention, by using the cemented carbide of the present invention having excellent plastic deformation resistance as a substrate, it is possible to realize highly efficient machining which meets the stricter cutting conditions and a long life.

REFERENCE SIGNS LIST

1 indexable insert (cutting tool)
2 rake face

3 flank face
4 edge (cutting edge)
5 mounting hole
10 substrate (cemented carbide)
20 hard coating

The invention claimed is:

1. A cemented carbide comprising a hard phase containing tungsten carbide particles and a binder phase containing, as a main component, an iron-group element, wherein the formula B/A≤0.05 is satisfied, where A represents the number of the tungsten carbide particles, and B represents the number of tungsten carbide particles whose number of contact points with other tungsten carbide particles is 1 or less, wherein measuring the number of contact points of the tungsten carbide particles is configured to use an observation image that is obtained by a metallographic microscope or a scanning electron microscope, wherein each of the contact points is a portion where the tungsten carbide particles are in contact with each other without the binder phase therebetween in a planar structure of the cemented carbide, wherein the number of contact points is counted as 1 regardless of the size of thereof, in case that one of the tungsten carbide particles is continuously in contact with an adjacent tungsten carbide particle, and wherein the number of contact points is configured to be measured by each of the tungsten carbide particles.

2. The cemented carbide according to claim 1, wherein the cemented carbide includes, as the hard phase, a composite compound phase composed of at least one composite compound selected from carbides, nitrides, and carbonitrides containing Wand one or more elements selected from Group 4, 5, and 6 elements of the periodic table, excluding W, and Si;

the area fraction of the composite compound phase relative to any surface or cross section of the cemented carbide is 1% to 10%; and the proportion of a composite compound phase portion having an area of 10 $\mu m^2$ or more is less than 5% in the entire composite compound phase present in the surface or cross section.

3. The cemented carbide according to claim 1, wherein the iron-group element includes cobalt, and the cobalt content is 8% by mass or more.

4. The cemented carbide according to claim 1, wherein the tungsten carbide particles have an average particle diameter of 3 μm or more.

5. A cutting tool in which the cemented carbide according to claim 1 is used as a substrate.

6. The cutting tool according to claim 5, wherein the cutting tool is provided with a hard coating which covers at least part of a surface of the substrate.

* * * * *

UNITED STATES PATENT AND TRADEMARK OFFICE

CERTIFICATE OF CORRECTION

PATENT NO. : 10,987,739 B2
APPLICATION NO. : 15/735766
DATED : April 27, 2021
INVENTOR(S) : Tsuyoshi Yamamoto et al.

It is certified that error appears in the above-identified patent and that said Letters Patent is hereby corrected as shown below:

In the Claims

In Claim 2, Column 22, Line 5, "containing Wand one or more elements" should read -- containing W and one or more elements --.

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*